US009156455B2

(12) United States Patent
Schmitt et al.

(10) Patent No.: US 9,156,455 B2
(45) Date of Patent: Oct. 13, 2015

(54) ASSEMBLY MADE OF A PRESSURE MEDIUM STORAGE TANK AND A MANUALLY ACTUATED MAIN CYLINDER, IN PARTICULAR FOR A HYDRAULIC MOTORCYCLE BRAKE SYSTEM

(75) Inventors: Stefan A. Schmitt, Aschaffenburg (DE); Peter Tandler, Kronberg/Ts. (DE); Werner Krebs, Hambach (DE); Stephan Schlicht, Nauheim (DE); Hans-Jürgen Neumann, Rüsselsheim (DE); Christoph Schiel, Bad Nauheim (DE)

(73) Assignee: Continental Teves AG & Co. oHG (DE)

( * ) Notice: Subject to any disclaimer, the term of this patent is extended or adjusted under 35 U.S.C. 154(b) by 783 days.

(21) Appl. No.: 13/383,432

(22) PCT Filed: Jul. 5, 2010

(86) PCT No.: PCT/EP2010/059519
§ 371 (c)(1),
(2), (4) Date: Apr. 12, 2012

(87) PCT Pub. No.: WO2011/006784
PCT Pub. Date: Jan. 20, 2011

(65) Prior Publication Data
US 2012/0186245 A1    Jul. 26, 2012

(30) Foreign Application Priority Data

Jul. 16, 2009  (DE) .................. 10 2009 027 769
Sep. 16, 2009  (DE) .................. 10 2009 029 510
May 27, 2010  (DE) .................. 10 2010 029 337

(51) Int. Cl.
*B60T 11/26*     (2006.01)
*B60T 11/22*     (2006.01)
*B60T 17/22*     (2006.01)

(52) U.S. Cl.
CPC ............... *B60T 11/22* (2013.01); *B60T 17/222* (2013.01)

(58) Field of Classification Search
CPC ............................... B60T 11/22; B60T 17/222
USPC ............................................. 60/453, 585, 588
See application file for complete search history.

(56) References Cited

U.S. PATENT DOCUMENTS

| 4,062,774 A   | 12/1977 | Hinojosa |
| 4,103,492 A * | 8/1978  | Sakazume ........................ 60/588 |
| 4,502,281 A * | 3/1985  | Arakawa ......................... 60/585 |
| 6,996,985 B2* | 2/2006  | Bornkessel et al. ............ 60/585 |

FOREIGN PATENT DOCUMENTS

| DE | 39 21 310 A1   | 1/1991 |
| DE | 103 59 851 A1  | 3/2005 |
| GB | 2 400 896 A    | 10/2004 |

OTHER PUBLICATIONS

International Search Report for PCT International Application No. PCT/EP2010/059519 mailed Oct. 5, 2010.

* cited by examiner

*Primary Examiner* — Michael Leslie
(74) *Attorney, Agent, or Firm* — RatnerPrestia

(57) ABSTRACT

The invention relates to an assembly including a pressure medium reservoir and a manually actuable master cylinder, in particular for a hydraulic motorcycle brake system, wherein the pressure medium reservoir is connected permanently to the master cylinder by at least one pressure medium connection, wherein the master cylinder has at least one pressure chamber, which can be connected to wheel brakes. According to the invention, provision is made for a protection device to be arranged in the region of the pressure medium connection, the device preventing air from penetrating into the pressure chamber and allowing air to escape in the direction of the pressure medium reservoir.

12 Claims, 5 Drawing Sheets

A - A

ASSEMBLY MADE OF A PRESSURE MEDIUM STORAGE TANK AND A MANUALLY ACTUATED MAIN CYLINDER, IN PARTICULAR FOR A HYDRAULIC MOTORCYCLE BRAKE SYSTEM

CROSS REFERENCE TO RELATED APPLICATIONS

This application is the U.S. National Phase Application of PCT/EP2010/059519, filed Jul. 5, 2010, which claims priority to German Patent Application No. DE 10 2009 027 769.2, filed Jul. 16, 2009, German Patent Application No. DE 10 2009 029 510.0, filed Sep. 16, 2009 and German Patent Application No. DE 2010 029 337.7, filed May 27, 2010, the to contents of such applications being incorporated by reference herein.

FIELD OF THE INVENTION

The invention relates to an assembly comprising a pressure medium reservoir and a manually actuable master cylinder, in particular for a hydraulic motorcycle brake system, in accordance with an assembly comprising a pressure medium reservoir and a manually actuable master cylinder.

BACKGROUND OF THE INVENTION

An assembly of this kind is known from DE 103 59 851 A1, for example, which is incorporated by reference.

A particular physical effect leading to air being introduced into the hydraulic brake system and consequently to a reduced braking effect can occur in a "handbrake control" on motorcycles.

At high accelerations and excitation frequencies of above 300 Hz, the effect observed involves air bubbles being mixed into the brake fluid. The introduction of air bubbles from the air buffer above the surface of the liquid takes place in the pressure medium reservoir. At the critical accelerations and frequencies mentioned, there is then the special physical effect that these air bubbles fall to the bottom of the pressure medium reservoir, counter to their buoyancy force, and remain there while the ambient conditions concerned persist.

In the case of the known assemblies, some of the air bubbles can enter the master cylinder via the pressure medium connection. If there is then a brake actuation, some of the air is carried into the pressure chamber of the master cylinder during the brake release operation owing to the folding over of a master cylinder cup seal and leads there to an increased lever travel or a reduced braking effect during subsequent braking operations.

SUMMARY OF THE INVENTION

It is therefore an aim of an aspect of the present invention to avoid the disadvantages of the known assembly comprising a pressure medium reservoir and a manually actuable master cylinder.

According to aspects of the invention, this is achieved by virtue of the fact that a protection device is arranged in the region of the pressure medium connection, said device preventing air from penetrating into the pressure chamber and allowing air to escape in the direction of the pressure medium reservoir. This makes it possible to prevent the abovementioned effect having a negative influence on the brake system through air bubbles being able to enter the master cylinder from the pressure medium reservoir. At the same time, it is possible to enable correct bleeding of an emptied brake system, and any air rising up from the hydraulic system can escape during operation.

The protection device preferably extends from a bottom of the pressure medium reservoir into a reservoir interior.

According to advantageous aspects, the protection device can be formed integrally on the bottom of the pressure medium reservoir or can be fastened thereto.

According to an advantageous aspect of the invention, the protection device has a housing which extends around the pressure medium connection from the bottom of the pressure medium reservoir into the reservoir interior, wherein at least one opening spaced apart from the bottom is provided in the housing.

The housing of the protection device is preferably substantially pot-shaped with a cylindrical wall and an end wall, wherein the end wall of the protection device has at least one surface sloping at an angle to the bottom of the pressure medium reservoir and the opening for the escape of air in the direction of the pressure medium reservoir is provided between the cylindrical wall and the end wall of the protection device.

According to another advantageous aspect, a cloth, which prevents air bubbles from passing through, is provided in the housing of the protection device, wherein the housing has a bypass, which allows air to escape from the master cylinder.

A screen can preferably be provided in the wall of the housing in addition to the opening.

According to another advantageous aspect, provision is made for the cylindrical wall to have an oblique extension oriented in the direction of the bottom in the region of the opening.

Another advantageous aspect of the invention envisages that the housing of the protection device is substantially pot-shaped and is provided with a cylindrical wall and an end wall, wherein a float, which prevents air bubbles from being drawn in when additional pressure medium is drawn from the pressure medium reservoir and which allows air to escape from the master cylinder, is arranged in the housing.

In order to prevent the formation of air bubbles, it is possible, according to an advantageous aspect, for a metal foam or a metal sponge to be provided in the reservoir interior. The metal sponge or the metal foam can be fitted in the pressure medium reservoir as standard or at a later stage.

For this purpose, the metal foam or the metal sponge can be provided throughout the reservoir interior, wherein a free space for the introduction of a filling device is provided in the region of a filler neck. As a result, the metal sponge or metal foam can also act as a surge preventer.

The metal foam or the metal sponge preferably has a bleed opening in the region of the pressure medium connection.

BRIEF DESCRIPTION OF THE DRAWINGS

The invention is best understood from the following detailed description when read in connection with the accompanying drawing. Included in the drawing is the following figure.

DETAILED DESCRIPTION OF THE PREFERRED EMBODIMENTS

FIGS. 1 to 12 show schematically illustrative embodiments of an assembly according to aspects of the invention comprising a pressure medium reservoir 1 and a manually actuable master cylinder 2, in particular for a hydraulic motorcycle brake system, the construction and operation of which are fundamentally known.

A particular physical effect leading to air being introduced into the hydraulic brake system and consequently to a reduced braking effect can occur in a "handbrake control" on motorcycles.

At high accelerations and excitation frequencies of above 300 Hz, this effect involves air bubbles being mixed into the pressure medium, i.e. into the brake fluid. A legally prescribed volume of pressure medium is supplied to the brake system in the unpressurized pressure medium reservoir 1, with the pressure medium reservoir 1 being filled up to the MAX mark, as can be seen from FIG. 1, for example.

There is therefore an air buffer 3 above the surface of the liquid, with the result that the introduction of air bubbles from the air buffer 3 above the surface of the liquid takes place in the pressure medium reservoir 1 at the critical accelerations and frequencies mentioned, and the air bubbles fall to the bottom of the pressure medium reservoir 1, counter to their buoyancy force, and remain there while the ambient conditions concerned persist.

Figure 1:
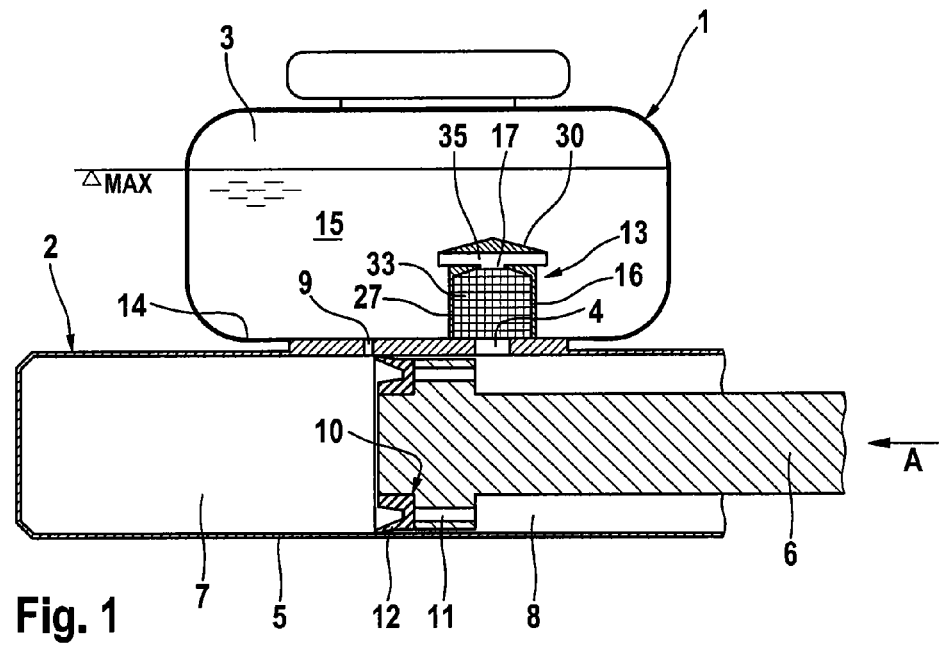
FIG. 1 shows a first illustrative embodiment of the assembly according to an aspect of the invention in section.

As is apparent from FIG. 1, which shows an assembly according to an aspect of the invention in longitudinal section, the pressure medium reservoir 1 and the master cylinder 2 are permanently connected by means of at least one pressure medium connection 4.

The master cylinder 2 is provided in the form of a "snifter-hole master cylinder" and comprises a piston 6, which is arranged in a housing 5 in such a way that it can be moved owing to brake actuation and to which a pressure chamber 7, which can be connected to wheel brakes, and a replenishment chamber 8 are assigned.

In an unactuated state of the master cylinder 2, the pressure chamber 7 is connected via a compensating hole 9 of very small diameter, the "snifter hole", to the pressure medium reservoir 1. When the master cylinder 2 is actuated in actuating direction A, the pressure chamber 7 is separated from the pressure medium reservoir 1 by means of a cup seal 10 arranged on the piston 6 as soon as the cup seal 10 has moved over the compensating hole 9. The replenishment chamber 8 is connected permanently to the pressure medium reservoir 1 by a replenishing hole, which is formed in the housing 5 and forms the pressure medium connection 4.

The piston 6 furthermore has axial compensating holes 11, through which additional pressure medium is drawn from the replenishment chamber 8 in the direction of the pressure chamber 7 when brake actuation is released. For this purpose, a radially outer, dynamically loaded sealing lip 12 of the cup seal 10 is pressed inward, allowing the pressure medium to flow out of the replenishment chamber 8, past the sealing lip 12, in the direction of the pressure chamber 7.

If the above-described effect occurs, some of the air bubbles in the case of known assemblies can enter the master cylinder 1 via the pressure medium connection 4, i.e. the replenishing hole between the pressure medium reservoir 1 and the replenishment chamber 8. If there is then a brake actuation, some of the air is carried from the replenishment chamber 8 into the pressure chamber 7 of the master cylinder 1 during the brake release operation owing to the folding over of the cup seal 10 and leads there to an increased lever travel or a reduced braking effect during subsequent braking operations.

In order to avoid these significant disadvantages, the assembly according to an aspect of the invention has a protection device 13, 18, 21, 24, 42 in the region of the pressure medium connection 4, said device preventing air from penetrating into the pressure chamber 7 or even into the replenishment chamber 8 and allowing air to escape in the direction of the pressure medium reservoir 1. This makes it possible to prevent the abovementioned effect having a negative influence on the brake system through air bubbles being able to enter the master cylinder 2 from the pressure medium reservoir 1. At the same time, it is possible to enable correct bleeding of an emptied brake system, and any air rising up from the hydraulic system can escape during operation.

The protection device 13, 18, 21, 24, 42 extends from a bottom 14 of the pressure medium reservoir 1 into a reservoir interior 15, thus preventing any air bubbles from passing through the pressure medium connection 4 as additional pressure medium is drawn in the direction of the replenishment chamber 8. For this purpose, the protection device 13, 18, 21, 24 can be formed integrally on the bottom 14 or can be fastened thereto at a later stage, for example. An integrally formed protection device has the advantage that no additional assembly steps are necessary. On the other hand, it may be possible under certain circumstances to supply a protection device 13 which has to be produced separately more cheaply.

Common to the protection devices 13, 18, 21, 24 of FIGS. 1 to 8 which are described below is that they each have a housing 16, 19, 22, 25 which extends around the pressure medium connection 4 from the bottom 14 of the pressure medium reservoir 1 into the reservoir interior 15, wherein at least one opening 17, 20, 23, 26 spaced apart from the bottom 14 is provided in the housing 16, 19, 22, 25, wherein the spacing of the opening 17, 20, 23, 26 from the bottom 14 has the advantage that the air bubbles that fall to the bottom 14 cannot readily be drawn into the opening 17, 20, 23, 26.

To ensure that the air bubbles cannot collect on the protection device 13, 18, 21 and cannot be drawn into the housing 16, 19, 22 from there, the housing 16, 19, 22 in accordance with the first five illustrative embodiments, which are shown in FIGS. 1 to 6, is substantially pot-shaped with a cylindrical wall 27, 28, 29 and an end wall 30, 31, 32, wherein the end wall 30, 31, 32 of the protection device 13, 18, 21 has at least one surface sloping at an angle to the bottom 14 of the pressure medium reservoir 1 and the opening 17, 20, 23 for the escape of air in the direction of the pressure medium reservoir 1 is provided between the cylindrical wall 27, 28, 29 and the end wall 30, 31, 32 of the protection device 13, 18, 21. In this case, the opening 17, 20, 23 is arranged in such a way that it is covered by the end wall 30, 31, 32 in the vertical direction, thus preventing descending air bubbles from falling directly into the opening 17, 20, 23.

Figure 2:
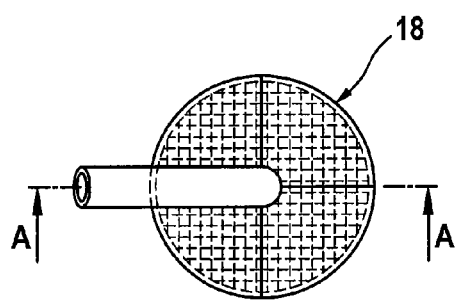
FIG. 2 shows a protection device of a second illustrative embodiment.
Figure 3:
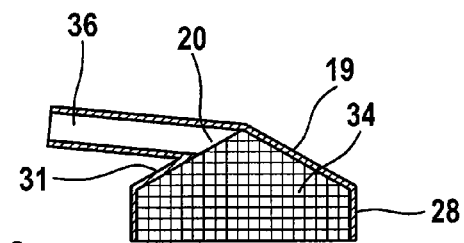
FIG. 3 shows a section along the line A-A of the protection device shown in FIG. 2.

In addition, the two first illustrative embodiments in accordance with FIGS. 1 to 3 have a cloth 33, 34 in the housing 16, 19 of the protection device 13, 18, said cloth preventing air bubbles from passing through, and the housing 16, 19 has a bypass 35, 36 (shown only in part), which allows air to escape from the master cylinder 2 in the direction of the pressure medium reservoir 1. The mesh size of the cloth 33, 34 is chosen so that no air bubbles which have fallen to the bottom 14 of the pressure medium reservoir 1 owing to the physical effect described can pass through the protection mechanism.

The filter area corresponds at least to the required flow rate obtained from the master cylinder volume and the permitted flow resistance at low temperature.

Figure 4:
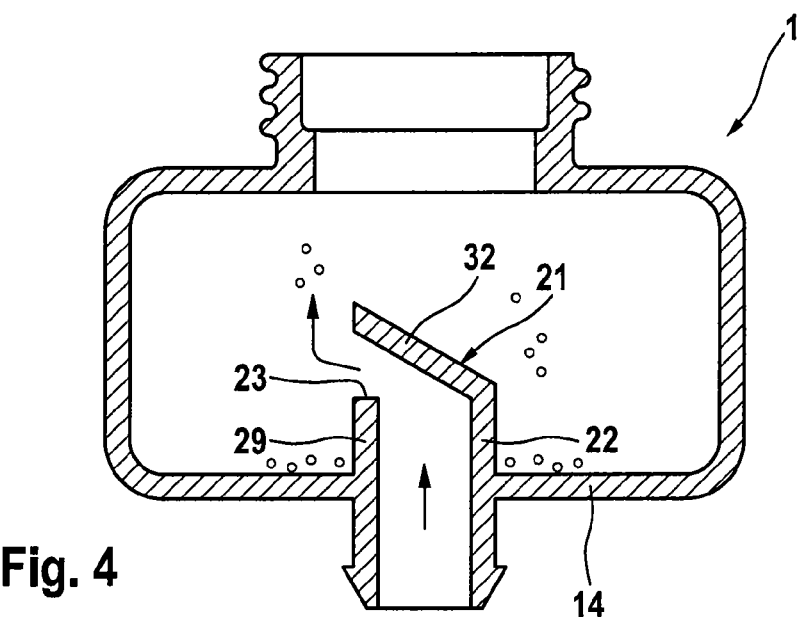
FIG. 4 shows a third illustrative embodiment of the assembly according to an aspect of the invention in section.
Figure 5:
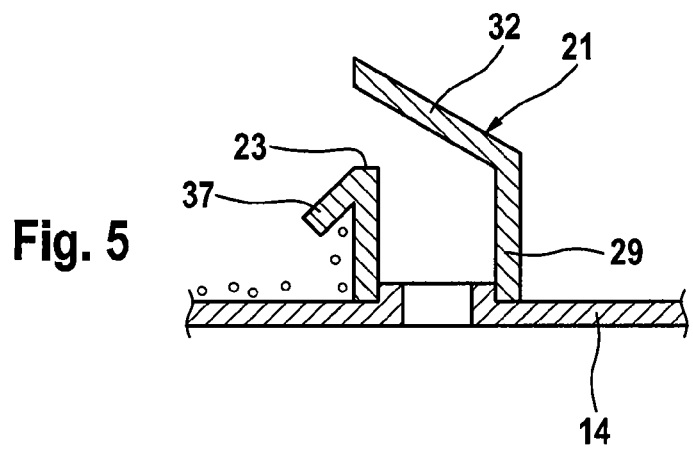
FIG. 5 shows a detail of a fourth illustrative embodiment of the assembly according to an aspect of the invention in section.

The fourth illustrative embodiment in accordance with FIG. 5 differs from the third illustrative embodiment in accordance with FIG. 4 in that the cylindrical wall 29 has an oblique extension 37 oriented in the direction of the bottom 14 in the region of the opening 23, preventing air bubbles from being drawn into the opening 23, even when there is strong suction on the additional pressure medium being drawn in.

Figure 6:
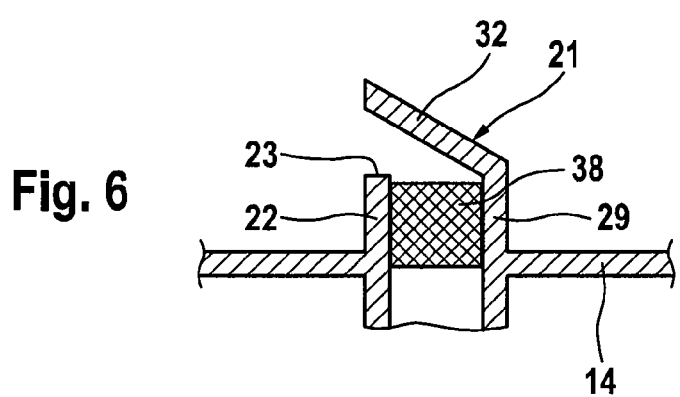
FIG. 6 shows a detail of a fifth illustrative embodiment of the assembly according to an aspect of the invention in section.

It is apparent from FIG. 6 that, in accordance with the fifth illustrative embodiment, a screen 38 is provided in the wall 29 of the housing 22 in addition to the opening 23. This can advantageously be molded simultaneously during production or, alternatively, can be provided as a retrofitted part. A screen area relative to the lateral opening 23 should be chosen so that the additional pressure medium is drawn in only via the screen area during replenishment and that the rising air bubbles can escape unhindered via the opening during bleeding.

Figure 7:
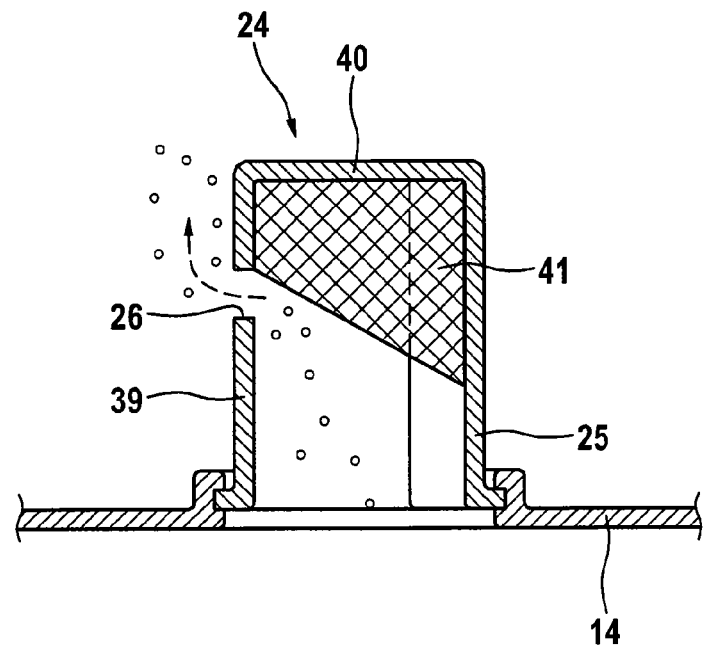
FIG. 7 shows a detail of a sixth illustrative embodiment of the assembly according to an aspect of the invention in section.
Figure 8:
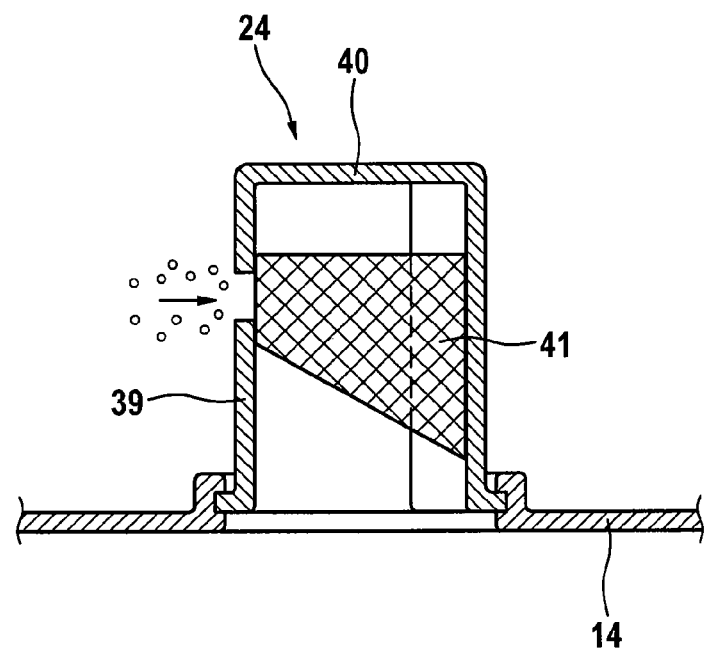
FIG. 8 shows the detail in accordance with FIG. 7 during a replenishing suction operation.

FIGS. 7 and 8 show the protection device 24 of the sixth illustrative embodiment in two different operating states of the assembly. The housing 25 of the protection device 24 is substantially pot-shaped and is provided with a cylindrical wall 39 and an end wall 40, wherein a float 41, which prevents air bubbles from being drawn in when additional pressure medium is drawn from the pressure medium reservoir 1 by virtue of the fact that it is sucked downward into the region of the opening 26 as additional pressure medium is drawn in and thereby closes the opening 26, as FIG. 8 shows, is arranged so as to be guided in the housing 25. It is apparent from FIG. 7 that the float 41 otherwise rises in the direction of the end wall 40 and thus allows air to escape from the master cylinder 1.

While remaining within the scope of aspects of the invention, all the illustrative embodiments described above can be designed in such a way that the protection devices 13, 18, 21, 24 can be fitted into the pressure medium reservoir 1 at a later stage, i.e. the protection devices 13, 18, 21, 24 are thus capable of being retrofitted.

FIGS. 9 to 12 show four additional illustrative embodiments of assemblies according to an aspect of the invention, in which a metal foam or a metal sponge 42 is provided as a protection device in the reservoir interior 15 of the pressure medium reservoir 1, preventing air bubbles from forming in the critical conditions described. The advantage of metal foam or metal sponges 42 is that they can be produced in any shape and can thus be fitted as standard or, alternatively, at a later stage into the pressure medium reservoir 1. Stainless steel wool can be used as a metal sponge, for example.

Figure 9:
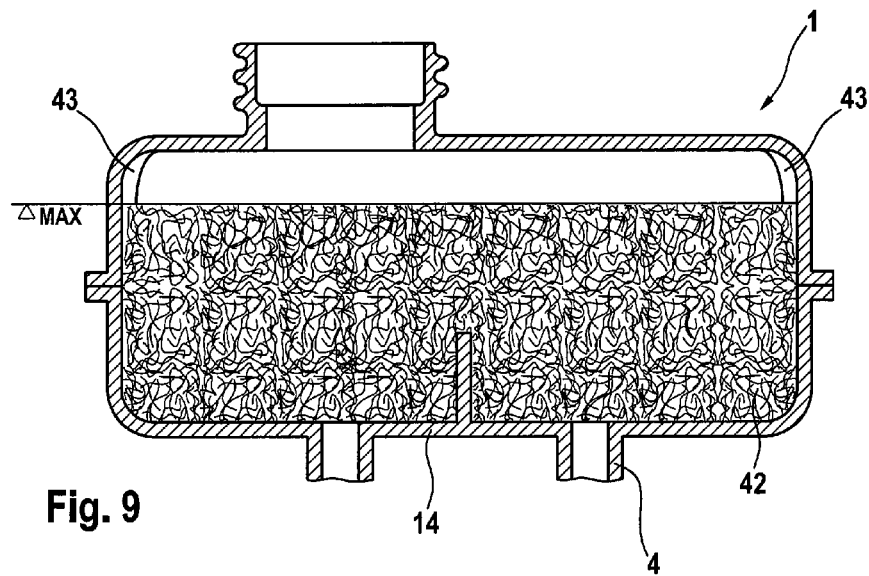
FIG. 9 shows a seventh illustrative embodiment of the assembly according to an aspect of the invention in section.

As is apparent from FIG. 9, the metal sponge 42 is provided up to the MAX mark and is held on the bottom 14 by hold-down devices 43 in this illustrative embodiment.

Figure 10:
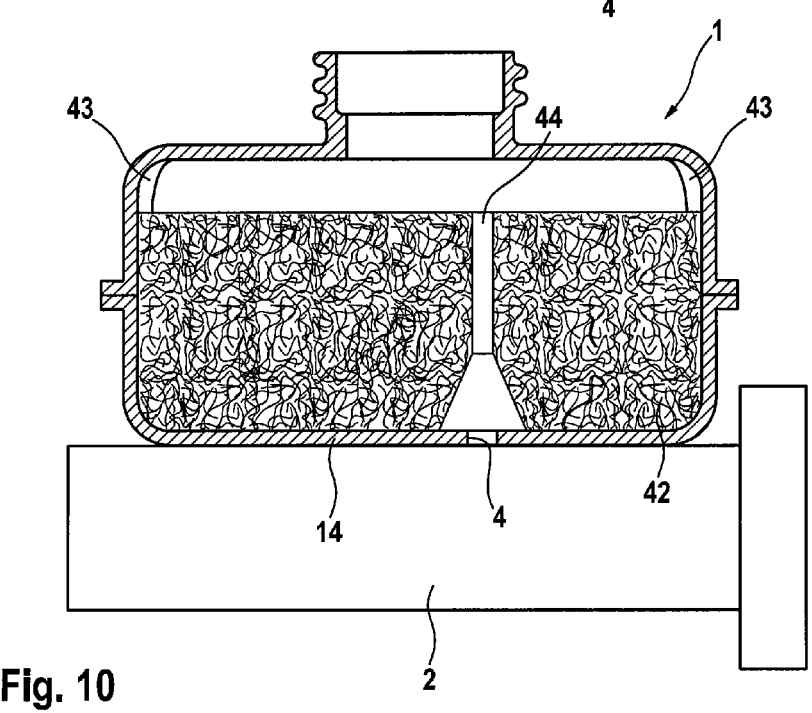
FIG. 10 shows an eighth illustrative embodiment of the assembly according to an aspect of the invention in section.

In contrast to the illustrative embodiment in accordance with FIG. 9, the eighth illustrative embodiment, which is shown in FIG. 10, provides for the metal foam or the metal sponge 42 to have a bleed opening 44 in the region of the pressure medium connection 4, thus enabling the air to escape unhindered from the master cylinder 2 into the pressure medium reservoir 1.

Figure 11:
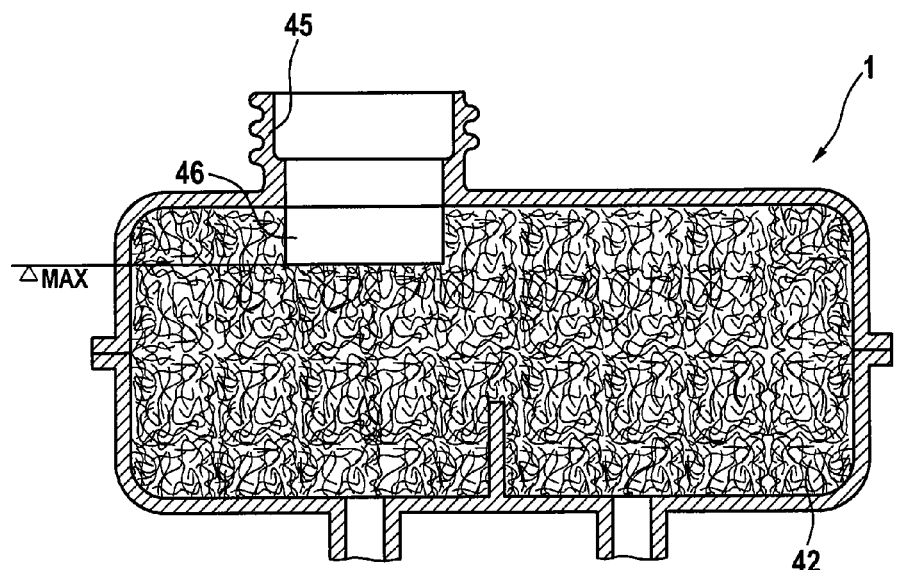
FIG. 11 shows a ninth illustrative embodiment of the assembly according to an aspect of the invention in section.
Figure 12:
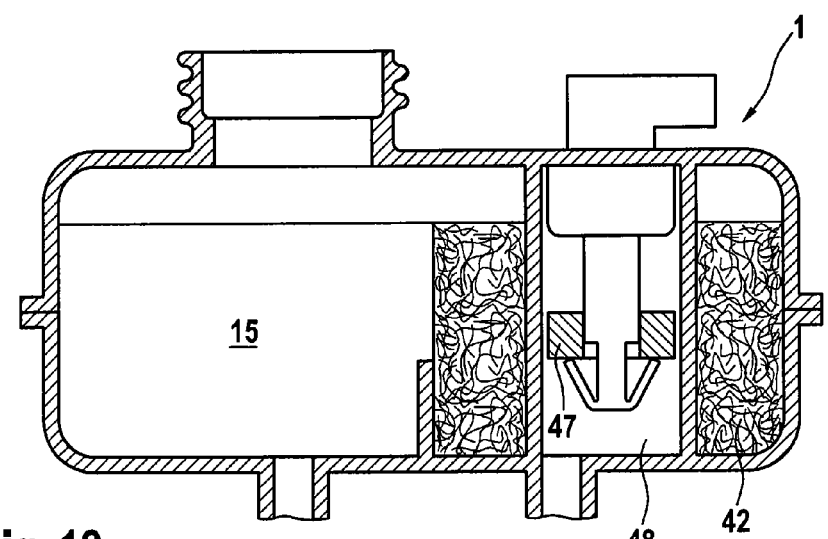
FIG. 12 shows a tenth illustrative embodiment of the assembly according to an aspect of the invention in section.

The ninth illustrative embodiment in accordance with FIG. 11 shows a metal sponge 42 which is provided throughout the reservoir interior 15. Only in the region of a filler neck 45 does the metal sponge 42 have a free space 46 for the introduction of a filling device.

An additional advantage is obtained when using the metal sponge 42 from the fact that it also serves as a surge preventer. Moreover, it is also possible for the metal sponge 42 in accordance with FIG. 12 to fill just a partial area of the reservoir interior 15. If the metal sponge 42 surrounds a float chamber 48 in which a float 47 is arranged as part of a reservoir warning device, this additionally serves as a mechanical damping or timing element.

LIST OF REFERENCE SIGNS

1 pressure medium reservoir
2 master cylinder
3 air buffer
4 pressure medium connection
5 housing
6 piston
7 pressure chamber
8 replenishment chamber
9 compensating hole
10 cup seal
11 compensating hole
12 sealing lip
13 protection device
14 bottom
15 reservoir interior
16 housing
17 opening
18 protection device
19 housing
20 opening
21 protection device
22 housing
23 opening
24 protection device
25 housing
26 opening
27 wall
28 wall
29 wall
30 end wall
31 end wall
32 end wall
33 cloth
34 cloth
35 bypass
36 bypass
37 extension
38 screen
39 wall
40 end wall
41 float 42 metal foam/metal sponge
43 hold-down device
44 bleed opening
45 filler neck
46 free space
47 float
48 float chamber
A actuating direction

The invention claimed is:

1. An assembly comprising a pressure medium reservoir and a manually actuable master cylinder for a hydraulic motorcycle brake system, wherein the pressure medium reservoir is connected permanently to the master cylinder by at least one pressure medium connection, wherein the master cylinder has at least one pressure chamber, which can be connected to wheel brakes, wherein a protection device is arranged in the region of the pressure medium connection, said device preventing air from penetrating into the pressure chamber and allowing air to escape in the direction of the pressure medium reservoir,
   wherein the protection device is formed integrally on a bottom of the pressure medium reservoir or is fastened thereto, and
   wherein the protection device has a housing which extends around the pressure medium connection from the bottom of the pressure medium reservoir into a reservoir interior, wherein at least one opening spaced apart from the bottom is provided in the housing.

2. The assembly as claimed in claim 1, wherein a screen is provided in the wall of the housing in addition to the opening.

3. The assembly as claimed in claim 1, wherein the cylindrical wall has an oblique extension oriented in the direction of the bottom in the region of the opening.

4. The assembly as claimed in claim 1, wherein the housing of the protection device is substantially pot-shaped and is provided with a cylindrical wall and an end wall, wherein a float, which prevents air bubbles from being drawn in when additional pressure medium is drawn from the pressure medium reservoir and which allows air to escape from the master cylinder, is arranged in the housing.

5. An assembly comprising a pressure medium reservoir and a manually actuable master cylinder for a hydraulic motorcycle brake system, wherein the pressure medium reservoir is connected permanently to the master cylinder by at least one pressure medium connection, wherein the master cylinder has at least one pressure chamber, which can be connected to wheel brakes, wherein a protection device is arranged in the region of the pressure medium connection, said device preventing air from penetrating into the pressure chamber and allowing air to escape in the direction of the pressure medium reservoir,
   wherein the protection device extends from a bottom of the pressure medium reservoir into a reservoir interior,
   wherein the protection device is formed integrally on the bottom of the pressure medium reservoir or is fastened thereto,
   wherein the protection device has a housing which extends around the pressure medium connection from the bottom of the pressure medium reservoir into the reservoir interior, wherein at least one opening spaced apart from the bottom is provided in the housing, and
   wherein the housing of the protection device is substantially pot-shaped with a cylindrical wall and an end wall, wherein the end wall of the protection device has at least one surface sloping at an angle to the bottom of the pressure medium reservoir and the opening for the escape of air in the direction of the pressure medium reservoir is provided between the cylindrical wall and the end wall of the protection device.

6. The assembly as claimed in claim 5, wherein a cloth, which prevents air bubbles from passing through, is provided in the housing of the protection device, wherein the housing has a bypass, which allows air to escape from the master cylinder.

7. The assembly as claimed in claim 5, wherein a screen is provided in the wall of the housing in addition to the opening.

8. The assembly as claimed in claim 5, wherein the cylindrical wall has an oblique extension oriented in the direction of the bottom in the region of the opening.

9. An assembly comprising a pressure medium reservoir and a manually actuable master cylinder for a hydraulic motorcycle brake system, wherein the pressure medium reservoir is connected permanently to the master cylinder by at least one pressure medium connection, wherein the master cylinder has at least one pressure chamber, which can be connected to wheel brakes, wherein a protection device is arranged in the region of the pressure medium connection, said device preventing air from penetrating into the pressure chamber and allowing air to escape in the direction of the pressure medium reservoir,
   wherein the protection device extends from a bottom of the pressure medium reservoir into a reservoir interior, and
   wherein a metal foam or a metal sponge is provided in the reservoir interior.

10. The assembly as claimed in claim 9, wherein the metal foam or the metal sponge is provided throughout the reservoir interior, wherein a free space for the introduction of a filling device is provided in the region of a filler neck.

11. The assembly as claimed in claim 10, wherein the metal foam or the metal sponge has a bleed opening in the region of the pressure medium connection.

12. The assembly as claimed in claim 9, wherein the metal foam or the metal sponge has a bleed opening in the region of the pressure medium connection.

* * * * *